Patented May 27, 1952

2,598,411

UNITED STATES PATENT OFFICE 2,598,411

REARRANGEMENT OF SATURATED HALOCARBONS

William T. Miller, Ithaca, N. Y., and Edward W. Fager, Chicago, Ill., assignors to the United States of America as represented by the United States Atomic Energy Commission No Drawing. Application November 23, 1948, Serial No. 61,722

13 Claims. (Cl. 260—653)

This invention relates to a process for preparing saturated perhalocarbons and more particularly to a process for preparing saturated perhalocarbons by intramolecular rearrangement.

It is an object of the present invention to provide a new method of preparing a saturated perfluorochlorocarbon in which the chlorine is easily rearranged with the fluorine.

A still further object is the provision of a process which attains in saturated haloperfluorocarbons fully fluorinated radicals easily and without the use of extreme reaction conditions or expensive equipment.

Another object is the provision of improved processes for the preparation of specific isomers of saturated perfluorochlorocarbons which are not readily obtained by existing methods.

Additional objects will become apparent from an examination of the following description and claims.

In this invention a saturated perhalocarbon, having $x$ and $y$ halogen atoms taken from the group composed of fluorine and chlorine, is treated to cause transfer within the molecule of the $x$ and $y$ halogen atoms so that the $x$ atom takes the place of the $y$ atom and the $y$ atom takes the place of the $x$ atom on their respective carbon atoms. By such rearrangement in chlorofluorocarbons —$CF_2$ and —$CF_3$ groups may be formed from —$CF_2Cl$ and —$CFCl$ groups. As specific examples of perhalocarbons in which the rearrangement of halogen atoms may take place are included 1,1,2-trichlorotrifluoroethane, 1,2,3,4-tetrachloroperfluorobutane, 2,2-dichloroperfluorocyclobutane, 1,2 - dichloroperfluoropropane, 1,2,3-trichloroperflurobutane, 1,2,5,6-tetrachloroperfluorohexane, sym.-difluorotetrachloroethane. The rearrangement reaction takes place in the presence of a catalyst when intimately mixed with the perhalocarbon and maintained in a state of suspension and heated for the period of reaction. The original perhalocarbon under these conditions is largely converted to a perhalocarbon in which the halogen atoms have exchanged places. For instance, with chlorofluorocarbons the chlorine atoms and fluorine atoms exchange places to bring about a complete fluorination of one of the carbon atoms and provide trifluoromethyl or difluoromethylene groupings more easily than by chlorine replacement.

For the rearrangement of the $x$ and $y$ atoms in saturated perhalocarbons, according to this invention, the halocarbon molecule is heated in contact with a catalyst for a relatively short period of time at a moderate temperature. The rearrangement in the carbon compounds promoted by this heating and catalysis yield substituted carbon atoms in which the $x$ and $y$ atoms tend to be gathered onto separate carbon atoms. For the purpose of affording a clear understanding of our invention but without imposing limitation thereon, the rearrangement of chlorine and fluorine atoms in perhalocarbon compounds will be described with particular reference to the treatment of perfluorochlorocarbons in the presence of a catalyst such as aluminum chloride or aluminum bromide. In the rearrangement of the halogen atoms in these carbon compounds the halocarbon is brought into contact with the catalyst at moderate temperatures for periods of the order of 1 to 6 hours so that relatively little replacement of fluorine occurs. The carbon compound is maintained in intimate contact with the catalyst. The products of the reaction are recovered in any suitable manner as by distilling directly or by washing to remove the catalyst and then distilling the organic layer to obtain separate boiling fractions one of which is the compound having the rearranged molecular structure. The rearranged fraction thus recovered may be recycled for purification since the equilibrium for these reactions is greatly in favor of the desired rearranged products. By this method the fluorine atoms are moved and become attached to carbon atoms having fluorine atoms so that the fluorine atoms are collected together to form —$CF_2$ and —$CF_3$ radicals.

The nature of the rearrangement of atoms involved in this invention may be illustrated by the following simplified equations:

I 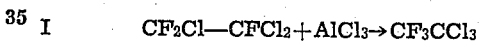

Reaction I represents the formation of 1,1,1-trifluorotrichloroethane from 1,1,2-trifluorotrichloroethane with the aid of aluminum chloride as a catalyst by refluxing. This reaction is not appreciably reversible because of the stability of the perfluoromethyl ($CF_3$) grouping.

II 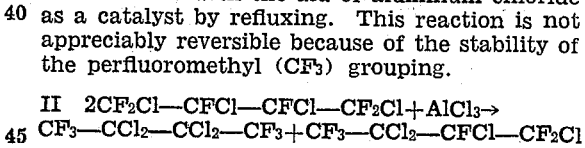

Reaction II represents the formation of 2,2,3,3-tetrachloroperfluorobutane from 1,2,3,4-tetrachloroperfluorobutane by the use of an aluminum chloride catalyst. Thus, the fluorine atoms on the 2 and 3 carbon atoms are shifted to the 1 and 4 carbon atoms, chlorine atoms taking their places on the 2 and 3 carbon atoms.

III 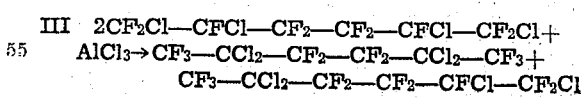

Reaction III represents the formation of 2,2,5,5-tetrachloroperfluorohexane from 1,2,5,6-tetrachloroperfluorohexane with the aid of aluminum chloride catalyst. By-products due to the replacement of fluorine by other halogen from the catalyst may be formed as well as the desired rearranged products. For example, in the rearrangement of 1,1,2-trichlorotrifluoroethane with aluminum chloride some 1,1-difluorotetrachloroethane is formed. In certain cases disproportionation reactions leading to the formation of products containing both more and less fluorine than the starting chlorofluorocarbon may be brought about by the rearrangement catalysts. In general we have found that these side reactions may be minimized by operation under relatively mild reaction conditions. For example, in some cases rearrangements may be brought about at below room temperature.

The catalysts employed in the present process may be powdered or dissolved in a solvent and mixed with the carbon compound to be rearranged or may be deposited on a suitable carrier such as sintered aluminum fluoride or activated charcoal and the carbon compound brought into contact with the catalyst. The catalyst employed may include aluminum chloride, aluminum bromide or their mixtures and may incorporate some of the other metal halides such as zirconium tetrachloride and antimony and mercury halides, particularly where it is desired to bring about simultaneously both replacement of chlorine by reaction with hydrogen fluoride as well as rearrangement. For example, aluminum fluoride and alumina mixtures with a sintered surface area may be treated with gaseous hydrogen chloride to convert a small percentage of the surface to form a surface layer of aluminum chloride as an active layer. Over this catalytic surface the process gas of the carbon compound to be rearranged may be passed at a suitable temperature to obtain the catalytic activity. Similar catalysts may be formed from alumina activated with hydrogen chloride. This would be especially suitable for vapor phase processes. Aluminum chloride or bromide may also be applied on charcoal for use in vapor phase processes. Another example of the application of the catalyst to the carbon compound to be rearranged would be powdering the catalyst such as aluminum chloride and adding it to the carbon compound and stirring the mixture to maintain the catalyst in suspension while maintaining a moderate temperature for a period of time such as five or six hours.

The following examples illustrate specific embodiments of our invention as applied to chloroperfluorocarbons. But it will be understood that similar results may be obtained by modified procedures without departing from the spirit of this invention.

I 1,1,2-trichlorotrifluoroethane. — One mole of powdered anhydrous aluminum chloride was added to six moles of $CF_2ClCFCl_2$ and the mixture heated to reflux with stirring in an oil bath maintained at 55–60° C. for five hours. Stirring was accomplished with a Herschberg type stirrer and maintained the aluminum chloride in suspension. The reaction mixture was poured into cracked ice, the organic layer separated, washed with water and dried by passage through a short column packed with phosphorus pentoxide. Distillation through an eleven plate column gave two fractions, one fraction representing 60% of the original weight of material boiling at 46–48° C. and the other fraction representing 40% of the original weight boiling at 91–92° C.

The low boiling fraction consisted of 90% of $CF_3CCl_3$ and 10% of $CF_2ClCFCl_2$ as determined by melting point. It constituted 50–55% of the original weight of material. Retreatment of this material with aluminum chloride under similar conditions gave an almost quantitative yield of $CF_3CCl_3$ which had the following properties: M. P. 13.5–14.0°; B. P. 46.4°; $n_D^{20}$ 1.3603; $d_{20}^4$ 1.5771.

The higher boiling fraction which corresponded to approximately 40% of the original weight of material consisted of $CF_2ClCCl_3$ which had the following properties: M. P. 40.5–40.6°; B. P. 91–92°.

II 1,1,2-trichlorotrifluoroethane. — Aluminum bromide, 0.045 mole, and $CCl_2FCClF_2$ B. P. 47.7° C., 0.85 mole, were mixed with cooling and stirred at about +1° C. for two hours. A 10 cc. sample was then removed and found to have a freezing point of −27° C. indicating that some rearrangement to form $CCl_3CF_3$ had occurred. The reaction mixture was allowed to warm slowly to +39° by regulating the cooling bath and stirred for 2.5 hours additional after the principal reaction was completed as indicated by heat evolution. Distillation yielded principally a trichlorotrifluoroethane fraction B. P. 45.5–46.0° C. (uncorr.) which was shown to be the rearranged product $CCl_3CF_3$ by its freezing point of +15° C. and about 9 g. of solid distillation residue.

Aluminum bromide is a very vigorous and valuable catalyst for promoting reactions of chlorofluorocarbons and, for example, causes a vigorous reaction when mixed with 1,1,2-trichlorotrifluoroethane or with 1,2-difluorotetrachloroethane at room temperature.

III 1,2,3-trichloropentafluoropropane. — One mole of powdered anhydrous aluminum chloride was added to six moles $CF_2ClCFClCF_2Cl$ and the mixture heated to reflux with stirring in an oil bath maintained at 80–90° C. for five hours. Distillation through an eleven plate column gave two principal fractions boiling at 70–72° C. and at 151–152° C.

The low boiling fraction, $CF_3CCl_2CF_2Cl$, which constituted 70% of the recovered material after redistillation had the following properties: M. P. −5° C.; B. P. 71–72°; $n_D^{23}$ 1.3490.

The high boiling material, $CF_3CCl_2CCl_3$, which composed 20% of the recovered material had the following properties after redistillation and crystallization from alcohol: M. P. 108.9–109.2°; B. P. 151.8–152.0°.

IV 1,2-difluorotetrachloroethane. — One hundred and seventy grams of a mixture of $CCl_2F\,CCl_2F$ and $CCl_3CClF_2$ in a ratio of about 7 to 3 with a melting point of 28.1° C. and 26 g. of granular aluminum chloride were heated with stirring over a period of two days. The starting liquid temperature was 30° C. This was gradually increased to 45° in order to maintain the mixture fluid as the melting point increased with reaction time. The product was separated from the aluminum chloride and distilled to yield the following fractions with the melting points indicated.

| Fraction No. | Boiling Point (uncorr.) °C | Weight g. | Melting point |
|---|---|---|---|
| 1 | 88.0-89.4 | 2.8 | 31.2 |
| 2 | 89.4-89.5 | 15.4 | 33.6 |
| 3 | 89.5-89.7 | 15.6 | 34.2 |
| 4 | 89.7-89.8 | 15.2 | 34.6 |
| 5 | 89.8-89.9 | 21.5 | 35.2 |
| 6 | 89.9-90.1 | 16.0 | 35.9 |
| 7 | Residue | 20.6 | 155±5° |

Since $CCl_3CClF_2$ has a melting point of about 40° C. and $CCl_2FCCl_2F$ of about 24° C. with mixtures forming mixed crystals with melting points in between the increase in proportion of $CCl_3CClF_2$ may be readily seen. The uncorrected boiling points of these isomeric compounds are both about 90° with $CCl_3CClF_2$ boiling slightly higher. An 83.7 g. sample of combined fractions 2 through 6 showed further conversion to $CCl_3CClF_2$ on heating with 13 g. aluminum chloride for about 26 hours.

The residue from the above distillation was composed of about 80% $CCl_3CCl_3$ in addition to the difluorotetrachloroethane.

Similarly, other perhalocarbons comparably treated will undergo rearrangement to produce isomers as shown in the above reaction equations II and III. This invention may be applied to 1,2-dichloroperfluorocyclobutane

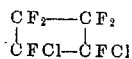

to produce 1,1-dichloroperfluorocyclobutane.

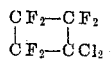

Similarly by treating 1,2-dichloroperfluoropropane, $CF_2Cl$—$CFCl$—$CF_3$, with a catalyst such as aluminum chloride according to this invention, the rearranged compound 2,2-dichloroperfluoropropane, $CF_3CCl_2CF_3$, is obtained.

Data indicates that the reaction of this invention is an intramolecular process not involving replacement of the halogens from molecules outside the halocarbon molecule. This data shows that radioactivity in the catalyst material used in treating a chlorofluorocarbon is not transferred to the fraction of the treated material which is formed by rearrangement. This result suggests that in the initial step of the process of this invention the halogen atom which is to be transposed and which is dissimilar from the halogen in the catalyst becomes coordinated with the catalyst and the rearrangement occurs without replacement. For instance, in the equation of reaction I, the catalyst is aluminum chloride and the fluorine atom on the second carbon atom is to be transferred. Accordingly, it is suggested that this fluorine atom becomes coordinated with the aluminum chloride catalyst.

There are numerous advantages of the process described herein. Among them is that it changes partially fluorinated compounds so that they are easier to fluorinate further. For instance, it is easier to pass from 1,1-dichloroperfluoroethane, $CFCl_2$—$CF_3$, to 1-monochloroperfluoroethane, $CF_2Cl$—$CF_3$, than it is to pass from dichlorotetrafluoroethane, $CClF_2$—$CClF_2$, to 1-monoperfluoroethane. Similarly advantageous syntheses of more highly fluorinated compounds by replacement of chlorine by fluorine in chlorofluoro compounds may be achieved by first rearranging the chlorofluoro compound according to the method of this invention to group the chlorines on fewer carbon atoms so as to produce $CCl_3$— or $CCl_2$— groupings and reduce the resistance to further fluorination.

Another advantage is the provision of a step in a process of combined steps for obtaining fully fluorinated carbons. In such a combined process the present invention is particularly advantageous in that it provides haloperfluorocarbons which can be further fluorinated more easily.

For instance, in a system providing perfluorocarbons by fluorination by steps the rearrangement of this process will change partially fluorinated compounds into other partially fluorinated compounds which are more easily fluorinated. Also the rearrangement of this invention can change partially fluorinated compounds to forms more suitable for further fluorination by providing compounds which may be utilized for alkylations of the Prins type by reaction with halo-olefins. The resulting Prins type reaction products are easily fluorinated to more fully fluorine substituted carbon compounds.

We claim:

1. The process of rearranging the position of the halogen atoms in a perhalocarbon containing at least two carbon atoms, two fluorine atoms, and two different halogens to produce an isomer which comprises treating said perhalocarbon at a temperature above its melting point between about 0° C. and about 95° C. for a period of time not substantially shorter than about one hour and not substantially greater than about seven hours in contact with a catalyst selected from the group consisting of aluminum chloride, aluminum bromide, and their mixtures with antimony halides and then separating out the structurally different intramolecularly rearranged isomer from the reaction mixture.

2. The process of rearranging the position of the halogen atoms in a perhalocarbon containing at least two carbon atoms, two fluorine atoms, and two different halogens to produce an isomer which comprises treating said perhalocarbon at a temperature above its melting point between about 0° C. and about 95° C. for a period of time not substantially shorter than about one hour and not substantially greater than about seven hours in contact with a catalyst selected from the group consisting of aluminum chloride, aluminum bromide, and their mixtures with mercury halides and then separating out the structurally different intramolecularly rearranged isomer from the reaction mixture.

3. The process of rearranging chlorine and fluorine atoms on a perchlorofluorocarbon compound containing at least two carbon atoms and at least two fluorine atoms to produce a structurally different isomer of the perchlorofluorocarbon with a catalyst selected from the group consisting of aluminum chloride and aluminum bromide which comprises bringing the perchlorofluorocarbon compound into contact with the catalyst, heating the compound and catalyst while in contact at a temperature between about 0° C. and about 95° C. for a period of time not substantially shorter than about one hour and not substantially greater than about seven hours, coordinating a fluorine atom with the catalyst, and rearranging the fluorine atom with a chlorine atom to produce an intramolecularly rearranged isomer of the perchlorofluorocarbon and then separating out the isomer.

4. The process of rearranging a chlorine and a fluorine atom on a chlorofluorocarbon containing at least two carbon atoms and at least two fluorine atoms with a catalyst selected from the group consisting of aluminum chloride and aluminum bromide to produce a structurally different isomer of the chlorofluorocarbon which comprises bringing the chlorofluorocarbon into contact with the catalyst, heating the chlorofluorocarbon and the catalyst while in contact at a temperature between about 0° C. and about 95° C. for a period of time not substantially shorter than about one hour and not substantially greater than about seven hours, coordinating the fluorine atom to be rearranged with the catalyst, rearranging the fluorine atom and the chlorine atom to produce an intramolecularly rearranged isomer, and separating out the isomer.

5. The process of rearranging the position of dissimilar halogen atoms in a perhaloethane containing at least two fluorine atoms and two different halogens to produce an isomer which comprises treating said ethane at a temperature of 0° to 65° C. for a period of time not substantially shorter than about one hour and not substantially greater than about seven hours in contact with a catalyst selected from the group consisting of aluminum chloride and aluminum bromide to produce an intramolecularly rearranged isomer and then separating out the isomer.

6. The process of rearranging the position of dissimilar halogen atoms in perhalopropane containing at least two fluorine atoms and two different halogens to produce an isomer which comprises treating said propane at a temperature of 75° to 95° C. for a period of time not substantially shorter than about one hour and not substantially greater than about seven hours in contact with a catalyst selected from the group consisting of aluminum chloride and aluminum bromide to produce an intramolecularly rearranged isomer and then separating out the isomer.

7. A process for rearranging the position of the halogen atoms in a perhalocarbon containing at least two carbon atoms, two fluorine atoms, and two different halogens having more than one carbon atom per molecule to produce an isomer which comprises treating said perhalocarbon at a temperature above its melting point between about 0° C. and about 95° C. for a period of time not substantially shorter than about one hour and not substantially greater than about seven hours in contact with an aluminum halide catalyst and recovering a structurally different intramolecularly rearranged isomer as a product of the process.

8. A process for gathering like halogen atoms of a perfluorochlorocarbon containing at least two carbon atoms and at least two fluorine atoms on separate carbon atoms which comprises treating said perfluorochlorocarbon in the liquid state at a temperature between about 0° C. and about 95° C. for a period of time not substantially shorter than about one hour and not substantially greater than about seven hours in contact with an aluminum halide catalyst under conditions such that like halogen atoms are gathered on separate carbon atoms and recovering a compound thus intramolecularly rearranged as a product of the process.

9. A process for converting 1,1,2-trifluorotrichloroethane to 1,1,1-trifluorotrichloroethane which comprises treating said ethane at a temperature above its melting point between about 0° C. and about 95° C. for a period of time not substantially shorter than about one hour and not substantially greater than about seven hours in contact with at least one compound selected from the group consisting of aluminum chloride and aluminum bromide and recovering 1,1,1-trifluorotrichloroethane as a product of the process.

10. A process for converting 1,2-difluorotetrachloroethane to 1,1-difluorotetrachloroethane which comprises treating said ethane at a temperature above its melting point between about 0° C. and about 95° C. for a period of time not substantially shorter than about one hour and not substantially greater than about seven hours in contact with at least one compound selected from the group consisting of aluminum chloride and aluminum bromide and recovering 1,1-difluorotetrachloroethane as a product of the process.

11. A process for converting 1,2,3-trichloropentafluoropropane to 1,2,2-trichloropentafluoropropane which comprises treating said propane at a temperature above its melting point between about 0° C. and about 95° C. for a period of time not substantially shorter than about one hour and not substantially greater than about seven hours in contact with at least one compound selected from the group consisting of aluminum chloride and aluminum bromide and recovering 1,2,2-trichloropentafluoropropane as a product of the process.

12. A process for converting 1,2,3,4-tetrachloroperfluorobutane to 2,2,3,3-tetrachloroperfluorobutane which comprises treating said butane at a temperature above its melting point between about 0° C. and about 95° C. for a period of time not substantially shorter than about one hour and not substantially greater than about seven hours in contact with at least one compound selected from the group consisting of aluminum chloride and aluminum bromide and recovering 2,2,3,3-tetrachloroperfluorobutane as a product of the process.

13. A process for converting 1,2,5,6-tetrachloroperfluorohexane to 2,2,5,5-tetrachloroperfluorohexane which comprises treating said hexane at a temperature above its melting point between about 0° C. and about 95° C. for a period of time not substantially shorter than about one hour and not substantially greater than about seven hours in contact with at least one compound selected from the group consisting of aluminum chloride and aluminum bromide and recovering 2,2,5,5-tetrachloroperfluorohexane as a product of the process.

WILLIAM T. MILLER.
EDWARD W. FAGER.

REFERENCES CITED

The following references are of record in the file of this patent:

UNITED STATES PATENTS

| Number | Name | Date |
| --- | --- | --- |
| 2,347,000 | Scherer et al. | Apr. 18, 1944 |
| 2,426,637 | Murray | Sept. 2, 1947 |
| 2,426,638 | Murray | Sept. 2, 1947 |

OTHER REFERENCES

Henne et al., J. Am. Chem. Soc., vol. 60, pp. 1697–8 (1938).

Calingeart et al., Jour. Am. Chem. Soc., vol. 61, pp. 2748–54 (1939); vol. 62, pp. 1545–7 (1940).